US012750386B2

(12) United States Patent
Carbune et al.

(10) Patent No.: US 12,750,386 B2
(45) Date of Patent: Sep. 29, 2026

(54) PERFORMING TASKS USING A NETWORK OF AGENTS WITH AN IMPROVED SECURITY LEVEL

(71) Applicant: GDM Holding LLC, Mountain View, CA (US)

(72) Inventors: Victor Carbune, Zürich (CH); Duc-Hieu Tran, Zürich (CH); Florian Nils Hartmann, Zürich (CH)

(73) Assignee: GDM Holding LLC, Mountain View, CA (US)

( * ) Notice: Subject to any disclaimer, the term of this patent is extended or adjusted under 35 U.S.C. 154(b) by 59 days.

(21) Appl. No.: 19/019,210

(22) Filed: Jan. 13, 2025

(65) Prior Publication Data

US 2026/0205477 A1 Jul. 16, 2026

(51) Int. Cl.
*H04L 9/40* (2022.01)
*H04W 24/02* (2009.01)

(52) U.S. Cl.
CPC ......... *H04L 63/1425* (2013.01); *H04W 24/02* (2013.01)

(58) Field of Classification Search
CPC . H04L 63/1416; H04L 63/1441; H04W 24/02
USPC ........................................................ 726/22
See application file for complete search history.

(56) References Cited

U.S. PATENT DOCUMENTS 8,914,878 B2 * 12/2014 Burns .................... H04L 63/14 726/13
12,113,660 B1 * 10/2024 Hargrove ................ H04L 41/06
12,265,856 B1 * 4/2025 Naanaa ..................... G06F 9/54
12,348,545 B1 * 7/2025 Parikh ...................... G06F 9/455
12,500,909 B1 * 12/2025 Westenberger ..... H04L 63/1416
2020/0067861 A1 * 2/2020 Leddy ................. G06F 21/6245
2024/0121262 A1 * 4/2024 Gill ...................... H04L 63/0263
2024/0404687 A1 * 12/2024 Bell ................. G06Q 10/06316
2024/0404712 A1 * 12/2024 Bell ....................... G06N 3/045
2024/0406166 A1 * 12/2024 Bell ....................... G06N 3/045
2025/0071027 A1 * 2/2025 Bakshi .................. H04L 63/205

OTHER PUBLICATIONS

Adiwardana et al., "Towards a human-like open-domain chatbot," CoRR, Jan. 27, 2020, arxiv.org/abs/2001.09977, 38 pages.
Agostinelli et al., "MusicLM: Generating music from text," CoRR, Jan. 26, 2023, arXiv:2301.11325, 15 pages.
Anil et al., "Gemini: a family of highly capable multimodal models," CoRR, Dec. 19, 2023, arXiv:2312.11805, 90 pages.
Anil et al., "Palm 2 technical report," CoRR, May 17, 2023, arXiv:2305.10403, 93 pages.
Borsos et al., "AudioLM: a language modeling approach to audio generation," IEEE/ACM Transactions on Audio, Speech, and Language Processing, Jun. 21, 2023, pp. 2523-2533.
Chowdhery et al., "PaLM: Scaling Language Modeling with Pathways," CoRR, Apr. 5, 2022, arXiv:2204.02311, 87 pages.

(Continued)

*Primary Examiner* — Samson B Lemma
(74) *Attorney, Agent, or Firm* — Fish & Richardson P.C.

(57) ABSTRACT

Methods, systems, and apparatus, including computer programs encoded on computer storage media, for performing collaborative tasks using a network of a plurality of agents with an improved security level by enabling early detection and warning about suspicious messages among the network of agents.

17 Claims, 4 Drawing Sheets

(56) References Cited

OTHER PUBLICATIONS

Raffel et al., "Exploring the limits of transfer learning with a unified text-to-text transformer," CoRR, Oct. 23, 2019, arXiv:1910.10683, 67 pages.
Ramesh et al., "Hierarchical text-conditional image generation with clip latents," CoRR, Apr. 13, 2022, arXiv:2204.06125, 27 pages.
Rombach et al., "High-resolution image synthesis with latent diffusion model," Proceedings of the IEEE/CVF Conference on Computer Vision and Pattern Recognition (CVPR), 2022, pp. 10684-10695.
Saharia et al., "Photorealistic text-to-image diffusion models with deep language understanding," Advances in Neural Information Processing Systems, 2022, 35:36479-36494.
Wallace et al., "The Instruction Hierarchy: Training LLMs to Prioritize Privileged Instructions," CoRR, Apr. 19, 2024, arxiv.org/abs/2404.13208v1, 13 pages.

* cited by examiner

PERFORMING TASKS USING A NETWORK OF AGENTS WITH AN IMPROVED SECURITY LEVEL

BACKGROUND

This specification relates to using a network of agents to perform tasks.

Some agents in the network can include neural networks. Neural networks are machine learning models that employ one or more layers of nonlinear units to predict an output for a received input. Some neural networks include one or more hidden layers in addition to an output layer. The output of each hidden layer is used as input to the next layer in the network, i.e., another hidden layer or the output layer. Each layer of the network generates an output from a received input in accordance with current values of a respective set of parameters.

SUMMARY

This specification describes a task execution system implemented as computer programs on one or more computers in one or more locations that performs a collaborative task using a network of a plurality of agents. The plurality of agents include one or more generative neural networks and one or more external tools. The plurality of agents can communicate with, i.e., transmit messages to or receive messages from, each other when performing the collaborative task.

According to an aspect, there is provided a method performed by one or more computers, the method comprising: receiving a prompt that describes a task to be performed by a plurality of agents; obtaining data representing a graph that comprises a plurality of nodes and a plurality of edges, wherein the plurality of nodes comprise a respective node representing each of the plurality of agents, and wherein each edge connects a respective pair of nodes from the plurality of nodes and represents a flow of information between a respective pair of agents represented by the respective pair of nodes; performing the task by using the plurality of agents, wherein performing the task comprises: generating, by a first agent of the plurality of agents, a message intended for a second agent of the plurality of agents; processing, by a message classification neural network, a message classification input that comprises data representing the graph and the message to generate a suspicion score for the message, wherein the suspicion score represents a likelihood that the message is a suspicious message; and determining whether to forward the message to the second agent based on the suspicion score.

The plurality of agents may comprise: at least one generative neural network; and at least one external tool.

The message may comprise a request for the second agent to perform a sub-task.

The message may comprise an intermediate result of a sub-task that has been performed by the first agent in response to a request from the second agent.

Determining whether to forward the message to the second agent based on the suspicion score may comprise: refraining from forwarding the message to the second agent when the suspicion score satisfies a threshold score.

Determining whether to forward the message to the second agent based on the suspicion score may comprise: if the suspicion score satisfies a threshold score, outputting a request for user confirmation prior to forwarding the message to the second agent; receiving a confirmation input confirming the forwarding of the message to the second agent; and determining to forward the message to the second agent in response to receiving the confirmation input.

The message classification neural network may comprise a graph embedding sub-neural network, a message embedding sub-neural network, and a classification sub-neural network.

Processing the message classification input to generate the suspicion score for the message may comprise: processing the graph using the graph embedding sub-neural network to generate (i) a node embedding for each of the plurality of nodes and (ii) an edge embedding for each of the plurality of edges; processing the message using the message embedding sub-neural network to generate a message embedding; and processing the node embeddings, the edge embeddings, and the message embedding using the classification sub-neural network to generate the suspicion score.

The message classification neural network may have been trained on a training dataset comprising synthetic data generated by using at least one synthetic malicious agent.

According to another aspect, there is provided one or more computer-readable storage media encoded with instructions that, when executed by one or more computers, cause the one or more computers to perform the operations of the above method aspect.

According to yet another aspect, there is provided a system comprising one or more computers and one or more storage devices storing instructions that when executed by one or more computers cause the one or more computers to perform the respective operations of the above method aspect.

It will be appreciated that features described in the context of one aspect may be combined with features described in the context of another aspect.

The subject matter described in this specification can be implemented in particular embodiments so as to realize one or more of the following advantages. The techniques described in this specification enable early detection and warning about suspicious messages among a network of agents. The network of agents includes agents that have diverse capabilities, and are geographically distributed. These characteristics, coupled with the growing number of agents in the network, raise questions about how to address problems posed by potentially malicious agents.

The techniques described in this specification can improve the security of the network of agents as well as prevent potentially malicious agents (e.g., malicious third-party applications, plug-ins, or services) in the network from compromising other agents in the network, e.g., by refraining from forwarding any messages that are classified as malicious to another agent in the network. The techniques described in this specification can also improve the performance of a task execution system across a range of collaborative tasks by preventing the potentially malicious agents from inhibiting, delaying, or otherwise interfering with the current progress toward task completion or a goal in an undesired manner. From another point of view, the described techniques reduce the consumption of computational resources required by a task execution system to perform these collaborative tasks, compared to a known system which is relatively more vulnerable to sabotage attacks of malicious agents which cause the known system to waste computational resources.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
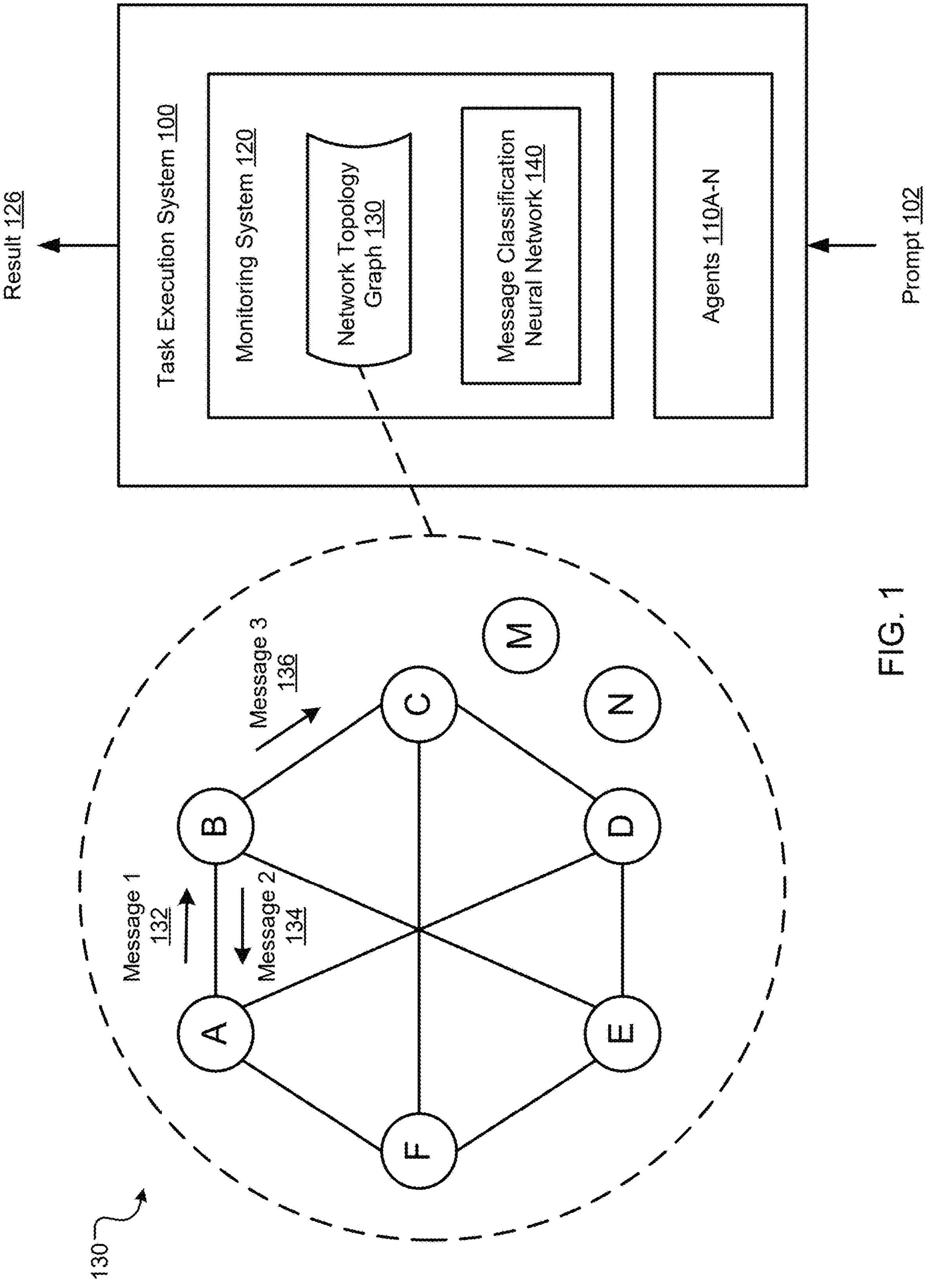
FIG. 1 is a diagram of an example task execution system.

FIG. 1 is a diagram of an example task execution system 100. The task execution system 100 is an example of a system implemented as computer programs on one or more computers in one or more locations that can perform tasks then output the results 126 for the tasks.

To perform each task, the task execution system 100 obtains instruction data that characterizes the task to be performed by the system and context data that will be processed by the system in order to perform the task. Collectively, such data will be referred to in this specification as "prompt data," or "prompt 102" for short.

The prompt 102 can include data in any of a variety of modalities, e.g., any of text, audio, images, videos, or other sensor measurements, e.g., Lidar data, EEG data, EKG data, and so on. Moreover, the prompt 102 can be obtained in any of a variety of ways.

In general, the task execution system 100 can receive the instruction data as a user input from an input device. The user input can include a touchscreen input, a voice input, a keyboard input, a gesture input, a mouse, trackpad, or other pointing device input entered through a local or remote user interface of the system, that characterizes the task to be performed. For example, the instruction data can be in the form of a request, an instruction, or a command that is in some natural language and that defines the task to be performed by the system.

In some cases, the task execution system 100 receives a natural language speech input from the user and converts the speech into the instruction data by applying a speech recognition engine to the speech. The instruction data may be received in the form of a sound (speech) signal, captured by a microphone input device, which is converted by a speech recognition engine, i.e., a speech-to-text converter to form the prompt. Alternatively, the instruction data may be entered by typing using a keyboard input device.

In some cases, the task execution system 100 receives the prompt 102 as part of a multi-modal input from the input device. In general, a multi-modal input is a combination of two or more different types of data, e.g., two or more of text data, audio data, image data, or graph data. As one example the multi-modal input may include a combination of i) text data representing text in a natural language and ii) pixels of an image or of video or audio data representing values of an audio waveform.

In some cases, the task execution system 100 can receive the context data in association with the instruction data. For example, the context data can also be received by the system together with the instruction data in a single user input or multiple user inputs.

In some other cases, unlike the instruction data, the context data can include prestored data, and the task execution system 100 can obtain the context data from a storage device that is accessible by the system.

In yet other cases, the task execution system 100 can obtain the context data from another system over a data communication network, e.g., through an application programming interface (API) that is made available by the other system. For example, the other system can be a sensor system (when the task is an agent control task) or a webpage capturing system, a screen recording system, or a screenshot capturing system (when the task is an automated assistance task).

The task execution system 100 includes or is in communication with a plurality of agents 110A-N. The plurality of agents 110A-N include one or more generative neural networks and one or more external tools. A network connects the plurality of agents 110A-N. For example, the network can be a local area network (LAN), a wide area network (WAN), the Internet, a cellular network, a peer-to-peer network, a mesh network, a cloud computing network, or a combination of these or other types of network.

In some implementations, the one or more generative neural networks can include a language model neural network that is configured to execute an auto-regressive token generation process to auto-regressively generate an output, e.g., a sequence of text tokens, a sequence of pixel tokens, a sequence of audio tokens, a sequence of multi-modal tokens, e.g., text and pixel tokens, or the like, across multiple time steps, for example by generating one token at each time step conditioned on any tokens that have already been generated in previous time steps.

The language model neural network can have any of a variety of Transformer-based neural network architectures, e.g., encoder-only Transformer architectures, encoder-decoder Transformer architectures, decoder-only Transformer architectures, other attention-based architectures, and so on.

Examples of language model neural networks include those described in Colin Raffel, et al. Exploring the limits of transfer learning with a unified text-to-text transformer. arXiv preprint arXiv:1910.10683, 2019; Daniel Adiwardana, et al. Towards a human-like open-domain chatbot. CoRR, abs/2001.09977, 2020; Aakanksha Chowdhery, et al. PaLM: Scaling Language Modeling with Pathways, arXiv preprint arXiv:2204.02311; Rohan Anil, et al. Palm 2 technical report. arXiv preprint arXiv:2305.10403, 2023; Gemini Team, Gemini: a family of highly capable multimodal models. arXiv preprint arXiv:2312.11805 (2023); Gemini Team, Gemini: a family of highly capable multimodal models. arXiv preprint arXiv:2312.11805 (2023); Borsos, Zalán, et al. Audiolm: a language modeling approach to audio generation. IEEE/ACM Transactions on Audio, Speech, and Language Processing (2023); and Agostinelli, Andrea, et al. Musiclm: Generating music from text." arXiv preprint arXiv:2301.11325 (2023).

In some implementations, the one or more generative neural networks can include a diffusion model neural network that is configured to execute a reverse diffusion process to iteratively generate an output, e.g., an image, a video, or an audio, across multiple reverse diffusion steps starting from random noise.

For example, the diffusion model neural network can generate an image by performing a reverse diffusion process to generate a diffusion output that includes or otherwise specifies a plurality of color values for pixels in the image arranged according to a specified order.

As another example, the diffusion model neural network can generate an image by performing a reverse diffusion process to generate a diffusion output that includes or otherwise specifies a plurality of tokens that represent image patch embeddings of the image which can then be processed by a decoder neural network to generate the image.

Examples of diffusion model neural networks include those described in Chitwan Saharia, et al. Photorealistic text-to-image diffusion models with deep language understanding. Advances in Neural Information Processing Systems, 35:36479-36494, 2022; Aditya Ramesh, et al. Hierarchical text-conditional image generation with clip latents. arXiv preprint arXiv:2204.06125; and Robin Rombach, et al. High-resolution image synthesis with latent diffusion model, Proceedings of the IEEE/CVF conference on computer vision and pattern recognition. 2022.

In some implementations, the one or more generative neural networks can include a corresponding generative neural network for each of multiple entities. An entity may be an individual. For example, the task execution system 100 can be implemented at least in part on a user device, e.g., a tablet computer, a smart phone, a gaming device, a digital assistant device, or the like, and the one or more generation neural networks can include a language model neural network that can be utilized by an automated assistant software application that is running on the user device.

Alternatively, an entity may be a group of people, e.g., an organization, a company, or a household, or the like. For example, the one or more generation neural networks can include a language model neural network that can be utilized by an automated assistant software application that is managed by each of multiple different entities, e.g., each of multiple different companies or organizations.

In other words, the task execution system 100 can include or have access to different generative neural networks that correspond to different entities. In these implementations, while some of the generative new networks may be hosted locally at the task execution system 100, others of the generative neural networks may be remote from the system, e.g., implemented in on-premise servers or mobile computing devices of the respective entities.

The one or more external tools are separate from the generative neural networks and, in some implementations, separate, e.g., remote, from the task execution system 100. For example, the task execution system 100 can host one of the generative neural networks, and the external tools can be implemented in one or more remote server systems that are separate from the task execution system 100.

An external tool can generally be any software that is accessible to and queryable by the task execution system 100, e.g., through application programming interface (API) calls, to provide query result data in response to a query. Examples of external tools include a search engine (e.g., an Internet search engine or a different search engine), a machine translation system, a question answering system, a calculator system, a calendar system, to name just a few.

The task execution system 100 can then incorporate the query result data, e.g., search results, calculator results, calendar dates, and so on, into an input before processing the input using a generative neural network. Thus, the output generated by using the generative neural network can incorporate information embedded into the query result data, including information that was not available or accessible during the training of the generative neural network, thus improving the quality of the output.

In general the task execution system 100 can utilize this multi-agent setup to perform any of a variety of collaborative tasks. A collaborative task is a task that requires at least two, and possibly all, of the plurality of agents 110A-N to each perform a respective sub-task of the task, in order to generate result 126 for the task. As part of the collaboration among the plurality of agents 110A-N, the plurality of agents 110A-N send and receive data messages (or "messages" for short) to and from each other over the network.

Some general examples of collaborative tasks include: composing a co-written document, e.g., a collaborative slide presentation document, a collaborative text document, a collaborative spreadsheet document, and so on; generating some content which is tailored to a group of people (e.g., content in a particular language, content suitable for a particular reading level, etc.); and creating new training data together (e.g., for collaborative machine learning).

A few more specific examples of the collaborative tasks follow.

As a specific example, the collaborative task can be a collaborative text generation task, and the task execution system 100 can be configured to perform the collaborative text generation task by using multiple generative neural networks to generate different portions of a text sequence. Thus, the result 126 generated by the task execution system 100 can include a first sequence of tokens generated by a first generative neural network, a second sequence of tokens generated by a second generative neural network, and so on. The result 126 can be presented for display to each of multiple collaborators, e.g., to the users who submitted the instruction data, context data, or both. By performing such a collaborative text generation task, the task execution system 100 can, for example, generate content faster than if the content was generated by a single user, and generate content tailored to different people in a group of people.

Examples of collaborative text generation tasks include a natural language processing or understanding task, e.g., an entailment task, a paraphrase task, a textual similarity task, a sentiment task, a sentence completion task, a grammaticality task, a machine translation task (where the prompt 102 includes text in a source language while the result includes an output sequence of text in a target language that is a translation of the source text into the target language), a question-answering task (where the prompt 102 includes an input sequence of text that identifies a question and the result 126 includes an output sequence of text that represents an answer to the question), a fact-checking task (where the prompt 102 includes an input sequence of text that represents a statement and the result 126 includes an output sequence of text that represents a prediction about whether the statement is factually true), and so on, that operates on a prompt 102 that includes an input sequence of text in some natural language to generate an output sequence of text that is similarly in some natural language.

Additional examples of collaborative text generation tasks include computer code generation task that operates on a prompt 102 that includes an input sequence of text in some natural language and/or computer programming language (e.g., Python, C++, C#, Java, Ruby, PHP, and so on) to generate an output sequence of text that is in some computer programming language. For example, the prompt 102 can include a text description of a desired piece of code or a snippet of computer code in a programming language and the result 126 can include computer code, e.g., a snippet of code that is described by the prompt or a snippet of code that follows the prompt in a computer program.

In the case of collaborative text generation tasks, the task execution system 100 can additionally make use of the one or more external tools. For example, the query result data, e.g., search results, calculator results, calendar dates, and so on, returned by an external tool can be incorporated into an input before processing the input using a generative neural network to generate (a portion of) the results 126.

For example, a result 126 for a collaborative text generation task can include a calculator result computed by calculator system. As another example, a result 126 for a collaborative computer code generation task can include a snippet of code retrieved from a code repository by a search engine.

As another specific example, the collaborative task can be a collaborative image or video generation task, and the task execution system 100 can be configured to perform the collaborative image or video generation task by using multiple generative neural networks to generate different portions of an image or a video.

Thus, the result 126 generated by the task execution system 100 can include a first block of pixels in an image generated by a first generative neural network, a second block of pixels in the image generated by a second generative neural network, and so on.

Alternatively the result 126 generated by the task execution system 100 can include a first frame in a video generated by a first generative neural network, a second frame in the video generated by a second generative neural network, and so on (where each frame includes pixels). The result 126 can be presented for display to a user, e.g., to the user who submitted the instruction data, context data, or both.

As another specific example similar to this, the task can be a collaborative audio generation task or another collaborative generation task to collaboratively generate data in some other modalities. For example, the task execution system 100 can use multiple generative neural networks to generate an image, a video, an audio, or data in another modality conditioned on the prompt 112 that includes a text description of the content of the image, the video, the audio, or the data in the other modality.

As another specific example, the collaborative task can be an automated assistance task within a suitable execution environment, e.g., a runtime environment or an operating system environment. That is, the task execution system 100 can receive instruction data as input from the user (e.g., typed or spoken natural language input) and respond with responsive content (e.g., textual, visual and/or audible natural language output). The task execution system 100 can control an automated assistant software application to perform a broad range of automated assistance tasks within the execution environment through interactions with various local and/or third-party applications, websites, or other agents.

The automated assistant software application can generally be any interactive software application that automatically performs tasks on behalf of an entity. Some automated assistant software applications can engage in human-to-computer and/or computer-to-computer dialogs. The automated assistant software application may also be referred to as an "automated assistant," a "virtual agent," a "digital agent," an "interactive assistant," an "intelligent assistant," an "assistant application," a "conversational agent," an "agent," or the like.

For example, a user can provide instruction data for an automated assistance task to the task execution system 100 which is then processed by the task execution system 100 to control an automated assistant in accordance with control inputs represented by the outputs generated by a generative neural network to perform the automated assistance task, and the task execution system 100 responds to the user by providing a result 126 that indicates a completion of the automated assistance task. The task execution system 100 can additionally and/or alternatively respond to instruction data provided by other automated assistants, e.g., automated assistants controlled in accordance with control inputs represented by the outputs generated by other generative neural networks.

Examples of the automated assistance tasks include completing a form on a website, scheduling an appointment through a calendar application, making a phone call through a telephone application, sending an email to a recipient through an e-mail application, sending an instant message through an instant messaging application, booking a flight reservation to a destination and/or a hotel reservation at the destination through a travel application, and so on.

In the case of automated assistance tasks, each of multiple entities can have their own generative neural network. For example, a hotel can have a generative neural network that is utilized by an automated assistant corresponding to the hotel. Analogously an airline company can have a generative neural network that is utilized by an automated assistant corresponding to the airline company.

Figure 2:
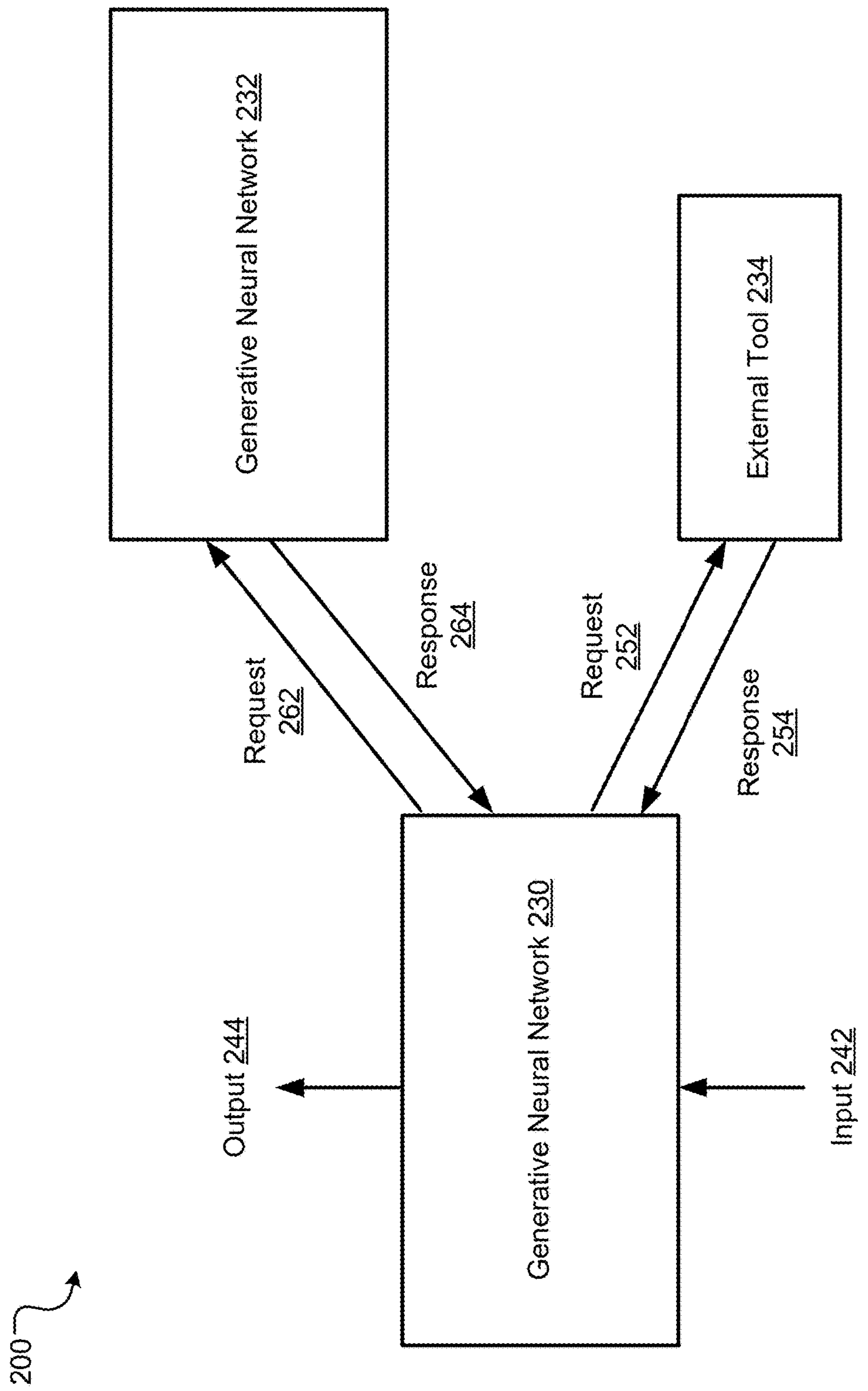
FIG. 2 is an example illustration of performing collaborative tasks using a plurality of agents.

FIG. 2 is an example illustration 200 of performing collaborative tasks using a plurality of agents that are connected by a network. The plurality of agents can include a first generative neural network 230, a second generative neural network 232, and an external tool 234.

Although FIG. 2 only illustrates one external tool, in other examples, there can be multiple external tools and description about the external tool 234 can apply similarly to each of the multiple external tools that may be included. Moreover, in other examples, there can be fewer generative neural networks, e.g., only the first generative neural network 230, or more generative neural networks, e.g., three, four, or more generative neural networks. In the latter case, the description about the generative neural networks 230, 232 can apply similarly to each of the generative neural networks that may be included.

As an example, the collaborative task can be a collaborative text generation task. In this example, the input 242 can include a prompt in natural language text from a user: "Tell me what the capital of Georgia is." In order to accurately respond to the input 242, the generative neural network 230 makes use of the external tool 234, which can be a search engine.

The generative neural network 230 generates a request 252 that is in the form of a search query in natural language text: "What is the capital of Georgia?" and submits the request 252 to the external tool 234. In response to the request 252, the external tool 234 (the search engine) performs a search on the Internet to obtain search results that include: "Tbilisi is the capital of the country of Georgia. Its cobblestoned old town reflects a long, complicated history, with periods under Persian and Russian rule . . . " and returns the search results as a response 254 for the request 252 to the generative neural network 230. The response 254 may also be viewed as an intermediate result of the sub-task (an Internet search task) that has been performed by the external tool 234.

Upon receiving the response 254 from the external tool 234, the generative neural network 230 incorporates the response 254 into an input and processes the input to generate an output 244 that is a response to the prompt in natural language text: "The capital of Georgia is Tbilisi." Thus, in this example, the output 244 generated by the generative neural network 230 incorporates the response 254 provided by the external tool 234.

As another example, the collaborative task can be an automated assistance task. In this example, the generative neural network 230 can be utilized by an automated assistant that is running on the user device that implements the task execution system 100. The input 242 can include a prompt in natural language text from a user of the user device: "I'm visiting Rome, Italy between Jul. 1 and Jul. 3, 2024. I need a place to stay during those days." In order to perform the automated assistance task (hotel reservation book task) characterized in the input 242, the generative neural network 230 interacts with the generative neural network 232, which can be a generative neural network that can be utilized by an automated assistant that is managed by the hotel.

The generative neural network 230 generates a request 256 that is in the form of a prompt in natural language text: "Book a reservation of one room at the hotel in Rome, Italy from Jul. 1 to Jul. 3, 2024." and submits the request 262 to the generative neural network 232. In response to the request 252, the generative neural network 232 (that is utilized by the automated assistant corresponding to the hotel) generates outputs that can be used to book the reservation. Once the reservation has been booked, the generative neural network 232 generates a response 264 for the request 262 in natural language text: "The reservation of one room from Jul. 1 to Jul. 3, 2024 is now booked. Here're the reservation details . . . " The response 264 may also be viewed as an intermediate result of the sub-task (a hotel booking task) that has been performed by the generative neural network 232.

Upon receiving the response 264 from the generative neural network 232, the generative neural network 230 incorporates the response 264 into an input and processes the input to generate an output 244 that is a response to the prompt in natural language text: "Done! I booked a hotel room for you from Jul. 1 to Jul. 3, 2024. Here're the reservation details . . . ." Thus, in this example, the output 244 generated by the generative neural network 230 incorporates the response 264 provided by the generative neural network 232.

In either example, the plurality of agents perform the task through collaboration, where each agent in the plurality of agents performs a respective sub-task of the task (e.g., the external tool 234 performs an Internet search task while the second generative neural network 232 performed a hotel booking task). As part of the collaboration among the plurality of agents, the plurality of agents send and receive data messages (or "messages" for short) to and from each other over the network. For example, the request 252 from the generative neural network 230 to the external tool 234 can be one message, and the response 254 from the external tool 234 to the generative neural network 230 can be another message.

The multi-agent setups improve the performance of the task execution system 100 on a variety of tasks, but come with additional problems for the task execution system 100. The network of agents 110A-N can include agents that have diverse capabilities, and are geographically distributed. These characteristics, coupled with the growing number of agents in the network, raise questions about how to address the problems posed by potentially malicious agents that might be included in the network.

For example, a compromised agent, e.g., a generative neural network (or an external tool) that has malicious software code embedded into the source code of the generative neural network (or the external tool), may generate suspicious messages that are intended for other agents. For example, the suspicious messages can include a request for a sabotage sub-task that, when performed by the other agent, will degrade the performance of the task execution system 100 on the tasks by inhibiting, delaying, or otherwise interfering with the current progress made by other agents toward the completion of a task.

As another example, a masquerade or replay attacker agent may generate suspicious messages intended for another agent that, when executed by the other agent, will undermine the information security and privacy protection of the task execution system 100. For example, the suspicious messages can include a masquerade attack message or a replay attack message for a response that includes private data from another agent.

To address the problems associated with the multi-agent setups when performing collaborative tasks, the task execution system 100 includes a monitoring system 120. The monitoring system 120 monitors the information flow between the plurality of agents 110A-N and takes responsive actions to mitigate risk posed by potential attacks.

For example, the monitoring system 120 can take actions against any malicious agent that might be included in the network to prevent the malicious agent from submitting messages to other agents connected by the network that would compromise the collaborative tasks that are being performed.

The monitoring system 120 is configured to generate data representing a graph 130 of a network topology for the plurality of agents 110A-N. The graph 130 of the network topology includes a plurality of nodes connected by a plurality of edges. Each node of the plurality of nodes represents a respective one of the plurality of agents 110A-N. Each edge of the plurality of edges represents a flow of information (e.g., a communication) between a respective pair of agents represented by the respective pair of nodes.

An exemplary depiction of the graph 130 of the network topology is shown on the left-hand side in FIG. 1. For example, in FIG. 1, the graph 130 includes 8 nodes: A, B, C, D, E, F, M, and N. The graph 130 also includes edges that connect some of the 8 nodes, e.g., an edge that connects nodes A and B, an edge that connects nodes A and F, and an edge that connects nodes A and D. The edges included in the graph 130 do not connect all of the 8 nodes, e.g., there is no edge that connects nodes A and N. In the example of FIG. 1, the edges are not directed. However, in other examples, the edges may be directed, e.g., where the direction indicates a direction of the flow of information.

In some implementations, the monitoring system 120 can generate the graph 130 of the network topology by monitoring the messages that are transmitted over the network between the plurality of agents 110A-N. To that end, some implementations of the monitoring system 120 can implement a network path tracing mechanism that continuously monitors the network and updates the graph 130 of the network topology in real-time in response to changes to the network.

For example, whenever a new agent is added to the network, the monitoring system 120 can add a new node that corresponds to the new agent to the graph 130 of the network topology. Analogously, whenever an existing agent is removed from the network, the monitoring system 120 can remove an existing node that corresponds to the existing agent from the graph 130 of the network topology.

As another example, whenever a new message is sent between a pair of agents (that are previously not connected to each other by an edge), the monitoring system 120 can add a new edge that represents an information flow between the pair of agents. For example, in FIG. 1, the edge that connects node B and node C can have been added by the monitoring system 120 after a message 136 was sent from node B to node C.

In some implementations, the monitoring system 120 does not add a new edge in response to a single new message sent between a pair of agents. Instead, the monitoring system 120 waits until a threshold number of messages have been sent between the pair of agents before adding the new edge that represents the information flow between the pair of agents. For example, in FIG. 1, the edge that connects node A and node B can have been added by the monitoring system 120 after 2 messages have been communicated between node A and node B—a message 132 sent from node A to node B and a message 134 sent from node B to node A.

In some implementations, the nodes have node attributes, and the monitoring system 120 can generate the node attributes for a new node as it is being added to the graph 130 of the network topology. The node attributes for a node can characterize any aspect of an agent corresponding to the node.

For example, the node attributes for a node can indicate whether the agent corresponding to the node is a generative neural network or an external tool. As another example, the node attributes for a node can indicate an age of the agent corresponding to the node (i.e., a length of time since the agent is included in the plurality of agents).

In some implementations, the edges have edge attributes, and the monitoring system 120 can generate the edge attributes for a new edge as it is being added to the graph 130 of the network topology. The edge attributes for an edge can characterize any aspect of a flow of information between a pair of agents represented by nodes that are connected by the edge.

For example, the edge attributes for an edge can indicate the types of messages that are transmitted between a pair of agents, e.g., whether the messages are requests for sub-tasks or intermediate results of sub-tasks. As another example, the edge attributes for an edge can indicate a total count of the messages that have been transmitted between a pair of agents.

In this manner, the graph 130 of the network topology depicts plurality of agents 110A-N as nodes and their flows of information as edges connecting those nodes. One node that is connected to another node by an edge indicates that a flow of information already exists between the pair of nodes or, put another way, the node has communicated with the other node in the past. For example, in FIG. 1, a flow of information exists between node A and B.

In contrast, one node that is not connected to another node by an edge indicates that a flow of information does not exist yet between the pair of nodes or, put another way, the node has not communicated with the other node in the past. For example, in FIG. 1, a flow of information does not exist yet between node A and N.

The monitoring system 120 includes a message classification neural network 140. The message classification neural network 140 is configured to, for any message that is generated by an agent and intended for another agent, process a message classification input that includes data representing the graph 130 of the network topology and the message to generate a suspicion score for the message. The suspicion score represents a likelihood that the message is a suspicious message.

In some implementations, a suspicious message can be a malicious message. In some implementations, a suspicious message can be any message that is a response to a malicious message. For example, a suspicious message can include malicious code that when executed by another agent can cause a problem, e.g., lead to extended service interruptions and/or compromise of critical data, damages to the information technology infrastructure, and so on. As another example, a suspicious message can include text that requests data from another agent that should be kept secure or private by the other agent. In this example, if the other agent generated a message that is a response to the suspicious message and that contains the request data, then in some cases the message generated by the other agent may also be considered a suspicious message.

In some implementations, messages having higher suspicion scores will be considered by the monitoring system 120 as having a greater likelihood of being suspicious messages as compared to the messages having lower suspicion scores. For example, the suspicion score generated by the message classification neural network 140 for a message can be a single binary value, such as suspicious or not suspicious. As another example, the suspicion score generated by the message classification neural network 140 for a message can be a continuous value, e.g., a value between 0 and 1, or 0 and 100.

The message classification neural network 140 can be implemented with any appropriate neural network architecture that enables it to perform its described function. In one example, the message classification neural network 140 can include a graph embedding sub-neural network, a message embedding sub-neural network, and classification sub-neural network. A sub-neural network of a neural network refers to a group of one or more neural network layers in the neural network.

The graph embedding sub-neural network can have any appropriate graph neural network architecture, i.e., can be any appropriate graph neural network that includes one or more graph neural network layers, that is configured to process data representing the graph 130 of the network topology to generate (i) a node embedding for each of the plurality of nodes and (ii) an edge embedding for each of the plurality of edges. For example, an embedding can be a vector of floating point or other numeric values that has a fixed dimensionality.

The graph neural network layers can apply any of a variety of message passing techniques to generate the node and edge embeddings. Examples include those employed by Graph Attention Networks, Message Passing Neural Networks, Graph Convolutional Networks, and so on.

The message embedding sub-neural network can have any appropriate feedforward neural network architecture, e.g., can include one or more fully connected layers, one or more attention layers, or one or more other neural network layers, that is configured to process the message to generate a message embedding for the message.

The classification sub-neural network can have any appropriate neural network architecture, e.g., can include one or more output layers, that is configured to process the node embeddings, the edge embeddings, and the message embedding to generate the suspicion score as output. For example, the one or more output layers can include pooling layers, activation layers, and so forth.

Such a message classification neural network 140 can be trained on a training dataset based on optimizing a classification loss function. The training dataset includes multiple training examples. Each training example, in turn, include (i) a training input that includes (a) data representing a graph of a network topology and (b) a message and (ii) a ground truth suspicion score for the training input, i.e., a target suspicion score to be generated by the message classification neural network 140 by processing the training input.

In some implementations, the training dataset can include training examples that are generated based on historical data collected while the task execution system 100 performed collaborative tasks, e.g., based on historical messages generated by the plurality of agents 110A-N in the past. In some implementations, the training dataset can include training examples that are generated based on synthetic data generated by using at least one synthetic malicious agent. For example, some training examples can each include a training input that includes a synthetic suspicious message that is generated by a synthetic malicious agent.

Additionally, or alternatively, such a message classification neural network 120 can be continuously trained as the task execution system 100 performs more collaborative tasks, such that the message classification neural network 120 can incorporate any changes in the network of agents 110A-N into its parameters to ensure that the neural network is as up-to-date and accurate for new collaborative tasks as possible.

For example, as new messages are being generated by agents that recently joined the network, the task execution system 100 can obtain data, e.g., user inputs, specifying whether these messages are suspicious messages, and then re-train the message classification neural network 120 based on the data.

For example, by virtue of the continuous training, the message classification neural network 120 can take into account changes to the communication pattern between the plurality of agents 110A-N when performing different collaborative tasks, to allow it to more accurately generate a suspicion score for a new message transmitted between a pair of agents when performing a new collaborative task that is lower than a suspicion score previously generated for a message transmitted between the same pair of agents when performing historical collaborative tasks.

Figure 3:
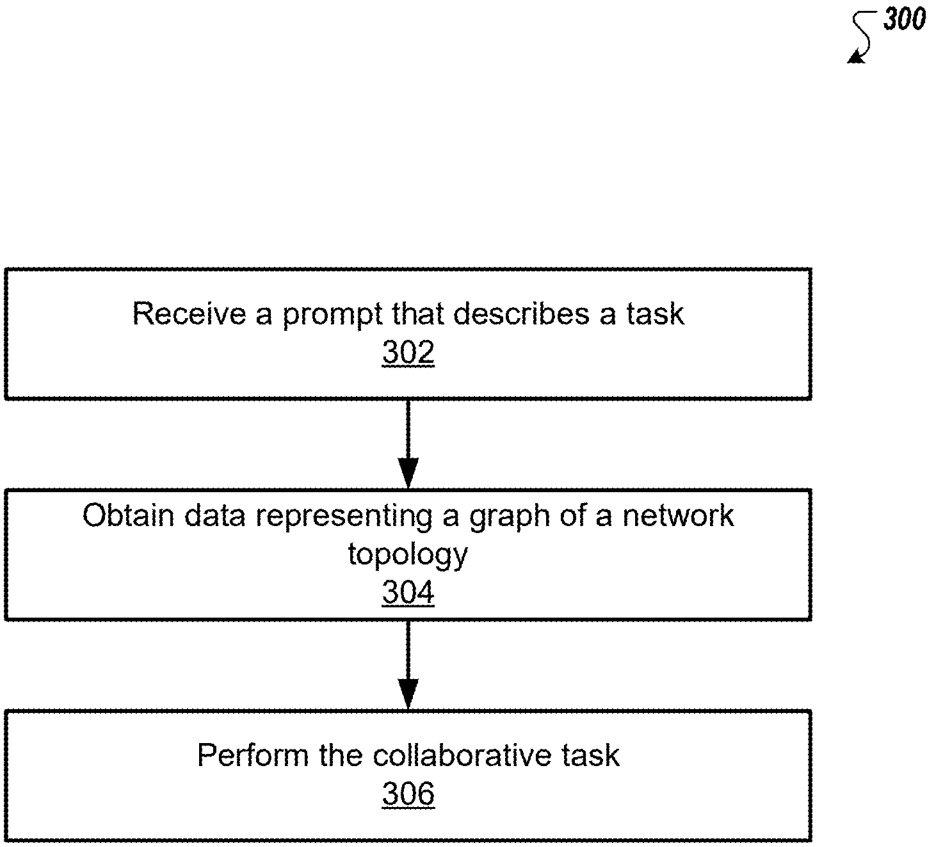
FIG. 3 is a flow diagram of an example process for performing a collaborative task by using a plurality of agents.

FIG. 3 is a flow diagram of an example process 300 for performing a collaborative task by using a plurality of agents. For convenience, the process 300 will be described as being performed by a system of one or more computers located in one or more locations. For example, a task execution system, e.g., the task execution system 100 of FIG. 1, appropriately programmed in accordance with this specification, can perform the process 300.

The system receives a prompt that describes a collaborative task to be performed by the plurality of agents (step 302). The plurality of agents include one or more generative neural networks and one or more external tools. A network connects the plurality of agents.

As previously mentioned, some implementations of the system include a local or remote user interface, and a user of the system can submit the prompt through the user interface, e.g. by providing the natural language description of the task, e.g., as typed or spoken text. Additionally or instead, the prompt that describes the task to be performed can be retrieved by the system from memory or obtained through a communications interface, e.g., through a wired or wireless network connection, from another system.

The system obtains data representing a graph of a network topology (step 304). The graph of the network topology includes a plurality of nodes and a plurality of edges. The plurality of nodes include a respective node representing each of the plurality of agents. Each edge connects a respective pair of nodes from the plurality of nodes and represents a flow of information (e.g., a communication) between a respective pair of agents represented by the respective pair of nodes.

A node in the graph of the network topology may or may not be connected to another node in the graph by an edge. For example, a node in the graph may not be connected to another node by an edge if no message has been sent to or received from the other node yet. The graph of the network topology can thus indicate whether a flow of information has occurred between a pair of agents before, i.e., can indicate whether a message has been transmitted between the pair of agents.

The system performs the collaborative task by using the plurality of agents to generate a result for the collaborative task (step 306). In some implementations where the system includes a local or remote user interface, an output for a collaborative text, image, video, or video generation task, can be provided through the user interface. A natural language output that indicates a completion of an automated assistance task can also be provided through the user interface, e.g., as typed or spoken text.

In some other implementations, an output for a collaborative text, image, video, or video generation task or a natural language output that indicates a completion of an automated assistance task can be stored in a memory, or output to another system for further processing through a communications interface.

As part of performing the collaborative task, the plurality of agents send and receive messages to and from each other over the network. As will be described below, at step 306, the system monitors the information flow between the plurality of agents and takes responsive actions against any malicious agent that might be included in the network to prevent the malicious agent from submitting messages to other agents connected by the network that would compromise the collaborative task that is being performed.

Figure 4:
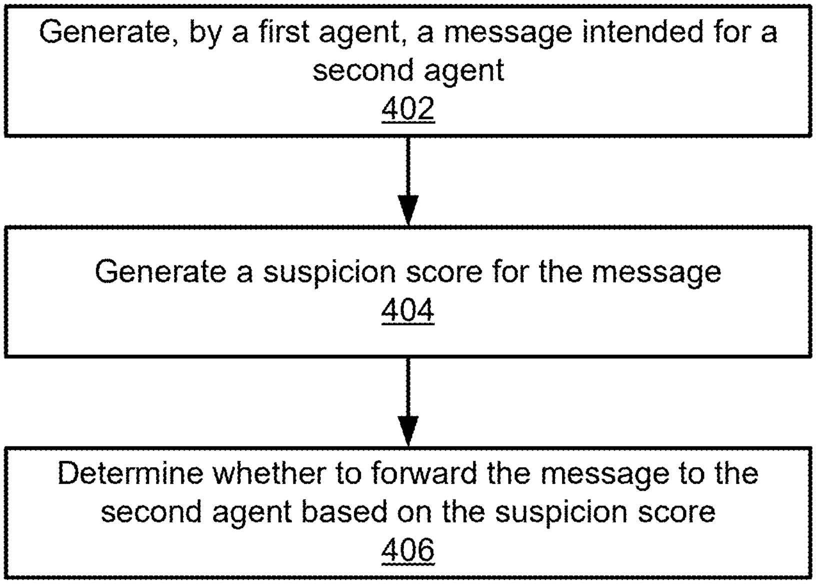
FIG. 4 is a flow diagram of sub-steps of one of the steps of the process of FIG. 3.

FIG. 4 is a flow diagram of sub-steps 402-406 of step 306 of the process 300 of FIG. 3. The system can repeatedly perform an iteration of steps 402-406 for every message generated by an agent in the plurality of agents when performing the collaborative task.

The system generates, by a first agent of the plurality of agents, a message intended for a second agent of the plurality of agents (step 402). For example, the message can be a request for the second agent to perform a sub-task. As another example, the message can be an intermediate result of a sub-task that has been performed by the first agent in response to a request from the second agent.

The system processes, by a message classification neural network, a message classification input that includes data representing the graph of the network topology and the message to generate a suspicion score for the message (step 404). The suspicion score represents a likelihood that the message is a suspicious message.

The system determines whether to forward the message to the second agent based on the suspicion score (step 406). In some implementations, the system compares the suspicion score to a threshold score and, when the suspicion score satisfies (e.g., is greater than) the threshold score, automatically refrains from forwarding the message to the second agent, and optionally, outputs a warning message.

In some implementations, when the suspicion score satisfies (e.g., is greater than) the threshold score, the system outputs a request, e.g., through the user interface, for user confirmation prior to forwarding the message to the second agent. Suppose that the system receives a confirmation input from a user approving the forwarding of the message to the second agent, the system proceeds to forward the message to the second agent. Alternatively, suppose that the system receives a rejection input from a user rejecting the forwarding of the output of the message to the second agent, the system refrains from forwarding the message to the second agent.

In some implementations, the system halts the performance of the collaborative task in response to the detection of a suspicious message. In some other implementations, the system replaces the suspicious message with a placeholder message then continues to perform the collaborative task based on the placeholder message. For example, the placeholder message can include data indicating that the original message was blocked due to the likelihood of being malicious.

In this specification, the term "configured" is used in relation to computing systems and environments, as well as computer program components. A computing system or environment is considered "configured" to perform specific operations or actions when it possesses the necessary software, firmware, hardware, or a combination thereof, enabling it to carry out those operations or actions during operation. For instance, configuring a system might involve installing a software library with specific algorithms, updating firmware with new instructions for handling data, or adding a hardware component for enhanced processing capabilities. Similarly, one or more computer programs are "configured" to perform particular operations or actions when they contain instructions that, upon execution by a computing device or hardware, cause the device to perform those intended operations or actions.

The embodiments and functional operations described in this specification can be implemented in various forms, including digital electronic circuitry, software, firmware, computer hardware (encompassing the disclosed structures and their structural equivalents), or any combination thereof. The subject matter can be realized as one or more computer programs, essentially modules of computer program instructions encoded on a tangible non-transitory storage medium for execution by or to control the operation of a computing device or hardware. The storage medium can be a storage device such as a hard drive or solid-state drive (SSD), a storage medium, a random or serial access memory device, or a combination of these. Additionally or alternatively, the program instructions can be encoded on a transmitted signal, such as a machine-generated electrical, optical, or electromagnetic signal, designed to carry information for transmission to a receiving device or system for execution by a computing device or hardware. Furthermore, implementations may leverage emerging technologies like quantum computing or neuromorphic computing for specific applications, and may be deployed in distributed or cloud-based environments where components reside on different machines or within a cloud infrastructure.

The term "computing device or hardware" refers to the physical components involved in data processing and encompasses all types of devices and machines used for this purpose. Examples include processors or processing units, computers, multiple processors or computers working together, graphics processing units (GPUs), tensor processing units (TPUs), and specialized processing hardware such as field-programmable gate arrays (FPGAs) or application-specific integrated circuits (ASICs). In addition to hardware, a computing device or hardware may also include code that creates an execution environment for computer programs. This code can take the form of processor firmware, a protocol stack, a database management system, an operating system, or a combination of these elements. Embodiments may particularly benefit from utilizing the parallel processing capabilities of GPUs, in a General-Purpose computing on Graphics Processing Units (GPGPU) context, where code specifically designed for GPU execution, often called kernels or shaders, is employed. Similarly, TPUs excel at running optimized tensor operations crucial for many machine learning algorithms. By leveraging these accelerators and their specialized programming models, the system can achieve significant speedups and efficiency gains for tasks involving artificial intelligence and machine learning, particularly in areas such as computer vision, natural language processing, and robotics.

A computer program, also referred to as software, an application, a module, a script, code, or simply a program, can be written in any programming language, including compiled or interpreted languages, and declarative or procedural languages. It can be deployed in various forms, such as a standalone program, a module, a component, a subroutine, or any other unit suitable for use within a computing environment. A program may or may not correspond to a single file in a file system and can be stored in various ways. This includes being embedded within a file containing other programs or data (e.g., scripts within a markup language document), residing in a dedicated file, or distributed across multiple coordinated files (e.g., files storing modules, subprograms, or code segments). A computer program can be executed on a single computer or across multiple computers, whether located at a single site or distributed across multiple sites and interconnected through a data communication network. The specific implementation of the computer programs may involve a combination of traditional programming languages and specialized languages or libraries designed for GPGPU programming or TPU utilization, depending on the chosen hardware platform and desired performance characteristics.

In this specification, the term "engine" broadly refers to a software-based system, subsystem, or process designed to perform one or more specific functions. An engine is typically implemented as one or more software modules or components installed on one or more computers, which can be located at a single site or distributed across multiple locations. In some instances, one or more dedicated computers may be used for a particular engine, while in other cases, multiple engines may operate concurrently on the same one or more computers. Examples of engine functions within the context of AI and machine learning could include data pre-processing and cleaning, feature engineering and extraction, model training and optimization, inference and prediction generation, and post-processing of results. The specific design and implementation of engines will depend on the overall architecture and the distribution of computational tasks across various hardware components, including CPUs, GPUs, TPUs, and other specialized processors.

The processes and logic flows described in this specification can be executed by one or more programmable computers running one or more computer programs to perform functions by operating on input data and generating output. Additionally, graphics processing units (GPUs) and tensor processing units (TPUs) can be utilized to enable concurrent execution of aspects of these processes and logic flows, significantly accelerating performance. This approach offers significant advantages for computationally intensive tasks often found in AI and machine learning applications, such as matrix multiplications, convolutions, and other operations that exhibit a high degree of parallelism. By leveraging the parallel processing capabilities of GPUs and TPUs, significant speedups and efficiency gains compared to relying solely on CPUs can be achieved. Alternatively or in combination with programmable computers and specialized processors, these processes and logic flows can also be implemented using specialized processing hardware, such as field-programmable gate arrays (FPGAs) or application-specific integrated circuits (ASICs), for even greater performance or energy efficiency in specific use cases.

Computers capable of executing a computer program can be based on general-purpose microprocessors, special-purpose microprocessors, or a combination of both. They can also utilize any other type of central processing unit (CPU). Additionally, graphics processing units (GPUs), tensor processing units (TPUs), and other machine learning accelerators can be employed to enhance performance, particularly for tasks involving artificial intelligence and machine learning. These accelerators often work in conjunction with CPUs, handling specialized computations while the CPU manages overall system operations and other tasks. Typically, a CPU receives instructions and data from read-only memory (ROM), random access memory (RAM), or both. The elements of a computer include a CPU for executing instructions and one or more memory devices for storing instructions and data. The specific configuration of processing units and memory will depend on factors like the complexity of the AI model, the volume of data being processed, and the desired performance and latency requirements. Embodiments can be implemented on a wide range of computing platforms, from small embedded devices with limited resources to large-scale data center systems with high-performance computing capabilities. The system may include storage devices like hard drives, SSDs, or flash memory for persistent data storage.

Computer-readable media suitable for storing computer program instructions and data encompass all forms of non-volatile memory, media, and memory devices. Examples include semiconductor memory devices such as read-only memory (ROM), solid-state drives (SSDs), and flash memory devices; hard disk drives (HDDs); optical media; and optical discs such as CDs, DVDs, and Blu-ray discs. The specific type of computer-readable media used will depend on factors such as the size of the data, access speed requirements, cost considerations, and the desired level of portability or permanence.

To facilitate user interaction, embodiments of the subject matter described in this specification can be implemented on a computing device equipped with a display device, such as a liquid crystal display (LCD) or an organic light-emitting diode (OLED) display, for presenting information to the user. Input can be provided by the user through various means, including a keyboard), touchscreens, voice commands, gesture recognition, or other input modalities depending on the specific device and application. Additional input methods can include acoustic, speech, or tactile input, while feedback to the user can take the form of visual, auditory, or tactile feedback. Furthermore, computers can interact with users by exchanging documents with a user's device or application. This can involve sending web content or data in response to requests or sending and receiving text messages or other forms of messages through mobile devices or messaging platforms. The selection of input and output modalities will depend on the specific application and the desired form of user interaction.

Machine learning models can be implemented and deployed using machine learning frameworks, such as TensorFlow or JAX. These frameworks offer comprehensive tools and libraries that facilitate the development, training, and deployment of machine learning models.

Embodiments of the subject matter described in this specification can be implemented within a computing system comprising one or more components, depending on the specific application and requirements. These may include a back-end component, such as a back-end server or cloud-based infrastructure; an optional middleware component, such as a middleware server or application programming interface (API), to facilitate communication and data exchange; and a front-end component, such as a client device with a user interface, a web browser, or an app, through which a user can interact with the implemented subject matter. For instance, the described functionality could be implemented solely on a client device (e.g., for on-device machine learning) or deployed as a combination of front-end and back-end components for more complex applications. These components, when present, can be interconnected using any form or medium of digital data communication, such as a communication network like a local area network (LAN) or a wide area network (WAN) including the Internet. The specific system architecture and choice of components will depend on factors such as the scale of the application, the need for real-time processing, data security requirements, and the desired user experience.

The computing system can include clients and servers that may be geographically separated and interact through a communication network. The specific type of network, such as a local area network (LAN), a wide area network (WAN), or the Internet, will depend on the reach and scale of the application. The client-server relationship is established through computer programs running on the respective computers and designed to communicate with each other using appropriate protocols. These protocols may include HTTP, TCP/IP, or other specialized protocols depending on the nature of the data being exchanged and the security requirements of the system. In certain embodiments, a server transmits data or instructions to a user's device, such as a computer, smartphone, or tablet, acting as a client. The client device can then process the received information, display results to the user, and potentially send data or feedback back to the server for further processing or storage. This allows for dynamic interactions between the user and the system, enabling a wide range of applications and functionalities.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

receiving a prompt that describes a task to be performed by a plurality of agents;

obtaining data representing a graph that comprises a plurality of nodes and a plurality of edges, wherein the plurality of nodes comprise a respective node representing each of the plurality of agents, and wherein each edge connects a respective pair of nodes from the plurality of nodes and represents a flow of information between a respective pair of agents represented by the respective pair of nodes;

performing the task by using the plurality of agents, wherein performing the task comprises:

generating, by a first agent of the plurality of agents, a message intended for a second agent of the plurality of agents;

processing, by a message classification neural network, a message classification input that comprises data representing the graph and the message to generate a suspicion score for the message, wherein the suspicion score represents a likelihood that the message is a suspicious message, and wherein processing the message classification input comprises processing the graph using a graph embedding sub-neural network included in the message classification neural network to generate (i) a node embedding for each of the plurality of nodes and (ii) an edge embedding for each of the plurality of edges;

determining whether to forward the message to the second agent based on the suspicion score; and wherein the determining comprises refraining from forwarding the message to the second agent when the suspicion score satisfies a threshold score, thereby preventing propagation of malicious messages between the plurality of agents.

2. The method of claim 1, wherein the plurality of agents comprise:

at least one generative neural network; and at least one external tool.

3. The method of claim 1, wherein the message comprises a request for the second agent to perform a sub-task.

4. The method of claim 1, wherein the message comprises an intermediate result of a sub-task that has been performed by the first agent in response to a request from the second agent.

5. The method of claim 1, wherein determining whether to forward the message to the second agent based on the suspicion score comprises:

if the suspicion score satisfies the threshold score, outputting a request for user confirmation prior to forwarding the message to the second agent;

receiving a confirmation input confirming the forwarding of the message to the second agent; and determining to forward the message to the second agent in response to receiving the confirmation input.

6. The method of claim 1, wherein the message classification neural network comprises the graph embedding sub-neural network, a message embedding sub-neural network, and a classification sub-neural network.

7. The method of claim 1, wherein processing the message classification input to generate the suspicion score for the message comprises:

processing the message using the message embedding sub-neural network to generate a message embedding; and processing the node embeddings, the edge embeddings, and the message embedding using the classification sub-neural network to generate the suspicion score.

8. The method of claim 1, wherein the message classification neural network has been trained on a training dataset comprising synthetic data generated by using at least one synthetic malicious agent.

9. A system comprising one or more computers and one or more storage devices storing instructions that when executed by the one or more computers cause the one more computers to perform operations comprising:

receiving a prompt that describes a task to be performed by a plurality of agents;

obtaining data representing a graph that comprises a plurality of nodes and a plurality of edges, wherein the plurality of nodes comprise a respective node representing each of the plurality of agents, and wherein each edge connects a respective pair of nodes from the plurality of nodes and represents a flow of information between a respective pair of agents represented by the respective pair of nodes;

performing the task by using the plurality of agents, wherein performing the task comprises:

generating, by a first agent of the plurality of agents, a message intended for a second agent of the plurality of agents;

processing, by a message classification neural network, a message classification input that comprises data representing the graph and the message to generate a suspicion score for the message, wherein the suspicion score represents a likelihood that the message is a suspicious message, and wherein processing the message classification input comprises processing the graph using a graph embedding sub-neural network included in the message classification neural network to generate (i) a node embedding for each of the plurality of nodes and (ii) an edge embedding for each of the plurality of edges;

determining whether to forward the message to the second agent based on the suspicion score; and wherein the determining comprises refraining from forwarding the message to the second agent when the suspicion score satisfies a threshold score, thereby preventing propagation of malicious messages between the plurality of agents.

10. The system of claim 9, wherein the plurality of agents comprise:

at least one generative neural network; and at least one external tool.

11. The system of claim 9, wherein the message comprises a request for the second agent to perform a sub-task.

12. The system of claim 9, wherein the message comprises an intermediate result of a sub-task that has been performed by the first agent in response to a request from the second agent.

13. The system of claim 9, wherein determining whether to forward the message to the second agent based on the suspicion score comprises:

if the suspicion score satisfies the threshold score, outputting a request for user confirmation prior to forwarding the message to the second agent;

receiving a confirmation input confirming the forwarding of the message to the second agent; and determining to forward the message to the second agent in response to receiving the confirmation input.

14. The system of claim 9, wherein the message classification neural network comprises the graph embedding sub-neural network, a message embedding sub-neural network, and a classification sub-neural network.

15. The system of claim 9, wherein processing the message classification input to generate the suspicion score for the message comprises:

processing the message using the message embedding sub-neural network to generate a message embedding; and processing the node embeddings, the edge embeddings, and the message embedding using the classification sub-neural network to generate the suspicion score.

16. The system of claim 9, wherein the message classification neural network has been trained on a training dataset comprising synthetic data generated by using at least one synthetic malicious agent.

17. One or more non-transitory computer storage media storing instructions that when executed by one or more computers cause the one more computers to perform operations comprising:

receiving a prompt that describes a task to be performed by a plurality of agents;

obtaining data representing a graph that comprises a plurality of nodes and a plurality of edges, wherein the plurality of nodes comprise a respective node representing each of the plurality of agents, and wherein each edge connects a respective pair of nodes from the plurality of nodes and represents a flow of information between a respective pair of agents represented by the respective pair of nodes;

performing the task by using the plurality of agents, wherein performing the task comprises:

generating, by a first agent of the plurality of agents, a message intended for a second agent of the plurality of agents;

processing, by a message classification neural network, a message classification input that comprises data representing the graph and the message to generate a suspicion score for the message, wherein the suspicion score represents a likelihood that the message is a suspicious message, and wherein processing the message classification input comprises processing the graph using a graph embedding sub-neural network included in the message classification neural network to generate (i) a node embedding for each of the plurality of nodes and (ii) an edge embedding for each of the plurality of edges;

determining whether to forward the message to the second agent based on the suspicion score; and wherein the determining comprises refraining from forwarding the message to the second agent when the suspicion score satisfies a threshold score, thereby preventing propagation of malicious messages between the plurality of agents.

* * * * *